Aug. 21, 1923.　　　　　　　　1,465,354
R. J. DONOGH
DEMOUNTABLE RIM
Filed Aug. 28, 1920
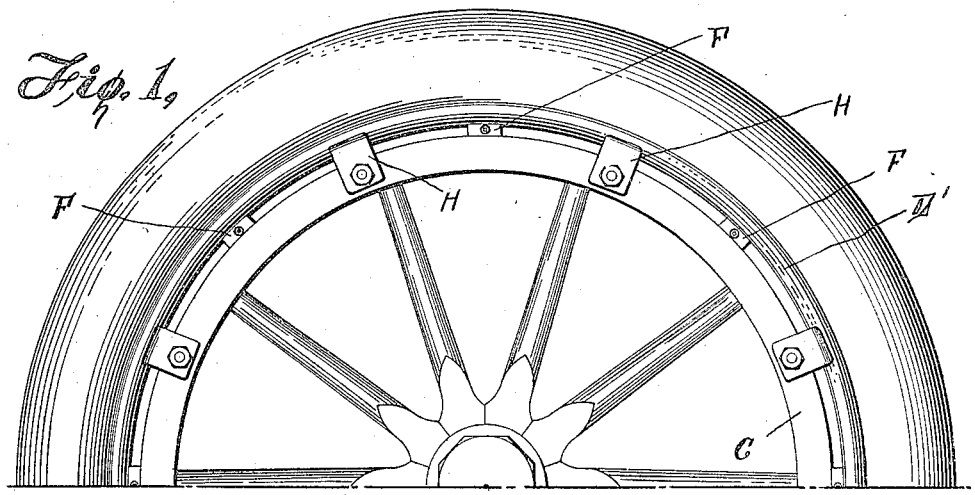
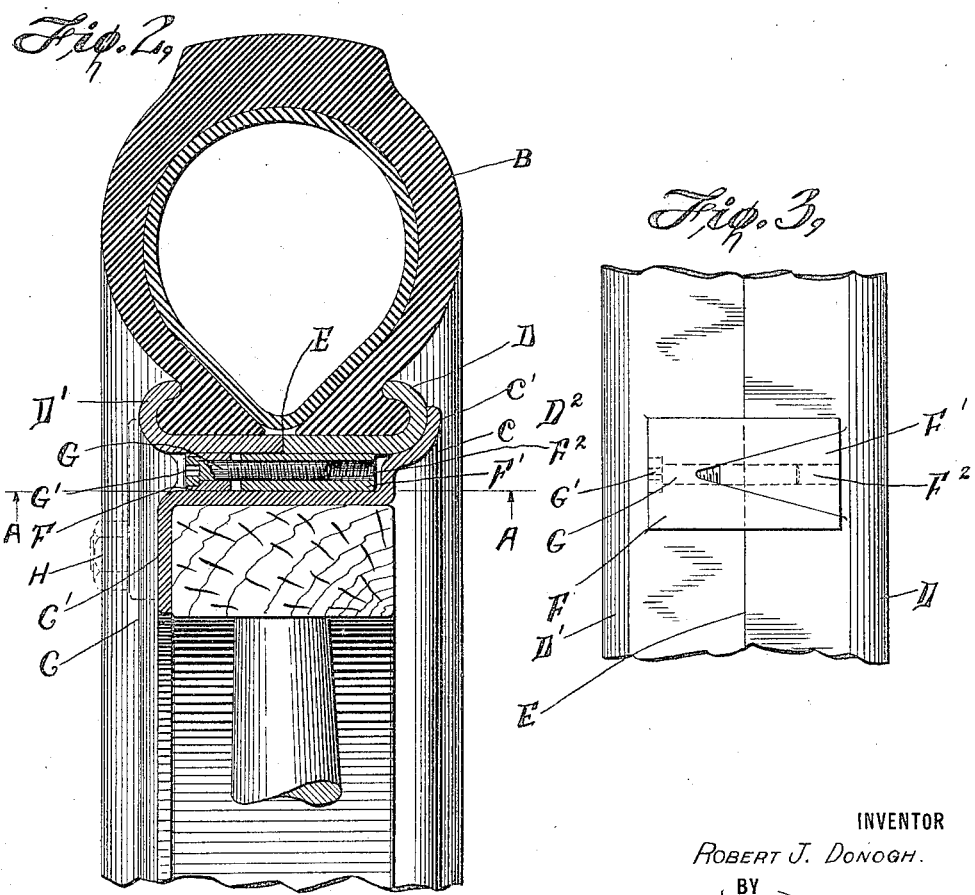
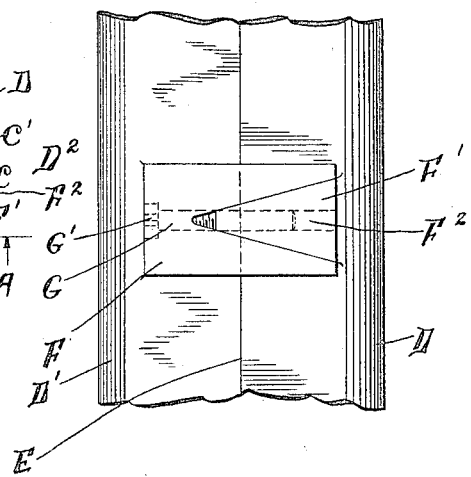
INVENTOR
ROBERT J. DONOGH.
BY
Frank M. Ashley
ATTORNEY Patented Aug. 21, 1923.

1,465,354

UNITED STATES PATENT OFFICE.

ROBERT J. DONOGH, OF NEW YORK, N. Y.

DEMOUNTABLE RIM.

Application filed August 28, 1920. Serial No. 406,555.

*To all whom it may concern:*

Be it known that ROBERT J. DONOGH, citizen of the United States, and resident of the city of New York, in the county of Kings and State of New York, has invented certain new and useful Improvements in Demountable Rims, of which the following is a specification.

My invention relates to demountable rims for wheels and the object of my invention is to provide a demountable rim comprising two parts extending circumferentially around a wheel and held together in separable relation by simple means which prevent relative movement between the rim portions in any direction.

A further object is to provide a construction in which said holding means act to support a part of the load carried by the wheel.

Referring to the drawings forming part of this specification,

Figure 1 is a side elevation of part of a wheel having a portion of a rim and holding means embodying my invention, mounted thereon.

Figure 2 is a cross sectional view of same taken on a median line through the holding means.

Figure 3 is a plan view of a portion of the rim and the said holding means mounted thereon.

A, indicates a wheel, B, a tire and C, a metallic felly band secured permanently to the felly of the wheel A, and having a concave bearing surface C' to support the convex portion $D^2$ of the rim section D. The rim section D' abuts the section D at the center E, and the holding means comprising a plate F is located in the space formed between the under side of the rim section D and D' and the upper side of the metal felly band C and is shaped to conform and contact with the surface of said felly band and thus support the band sections D and D'.

The plate F is spot welded to the rim portion D' as far as the dividing line E, and extends beyond said line in contact with the portion D but not welded thereto, and the wedge shaped portion E' is spot welded to the rim portion D and extends beyond the line E in contact with the surface of the rim portion D' but is not welded thereto. G, indicates a screw which extends through a hole G' formed in the plate F and screws into the threaded hole provided in the plate F' to hold the rim sections together. The screw G, is provided with a hexagon shaped socket $G^2$ to receive a socket wrench.

It is obvious that when the rim sections are connected together by a number of sets of plates disposed around the periphery of the wheel and connected as illustrated in Figures 2 and 3, that the rim sections cannot move relative to each other in any direction, each set of plates acting to prevent differential movement in any direction due to the overlapping of the ends of the plates F and F' and the close fitting of the V shaped wedge plate F' into the bifurcated portion of the plate F.

It will be also obvious that the strain on the screw G is a tension strain only and therefore a very small screw will serve the purpose of holding the rim sections together. The usual clamps H—H etc. are employed to hold the rim in position on the wheel. By removing the clamps H, the rim and tire may be moved laterally to remove them from the wheel, when by removing the screws G, the rim sections D' can be withdrawn from section D, and the tire B removed. By making the plates F and F' in the forms illustrated, it is easy to assemble the rim sections together and insure the screws coming exactly in line with the threaded openings in the respective plates.

Having thus described my invention I claim as new and desire to secure by Letters Patent;

A demountable rim comprising two rim sections and means for holding them together comprising two plates one of said plates being V shaped with the vertex of the V extending into a closed V shaped recess formed in the other plate, the V shaped plate being rigidly attached to one rim section, and projecting over the other rim section, the recessed plate being rigidly attached to the other rim section and extending over the first rim section and means passing through each of the plates whereby the plates are held together and centered with relation to each other.

Signed at New York city, in the county of New York and State of New York this 17th day of August A. D. 1920.

ROBERT J. DONOGH.

Witness:
FRANK M. ASHLEY.